March 12, 1946.   E. STATHER-DUNN   2,396,616
MANUFACTURE OF TIN-PLATED LEAD COLLAPSIBLE TUBES
Filed March 2, 1943

Inventor:-
Eustace Stather-Dunn,
By Howson and Howson,
Attorneys.

Patented Mar. 12, 1946

2,396,616

UNITED STATES PATENT OFFICE 2,396,616

MANUFACTURE OF TIN-PLATED LEAD COLLAPSIBLE TUBES

Eustace Stather-Dunn, London, England, assignor to Betts & Company Limited, London, England, a British company Application March 2, 1943, Serial No. 477,769
In Great Britain March 11, 1942

4 Claims. (Cl. 29—148.2)

The customary method of making sheet tin-plated lead for use in the manufacture of collapsible tubes is to lay on a thin rolled layer of tin, a thicker layer of lead, upon which is again laid another thin layer of tin; the three layers are then passed through a rolling machine and rolled to a smaller thickness, and this rolling action welds the three sheets together. The resulting composite sheet then has discs of appropriate diameter cut from it and these discs are placed into a die of suitable shape, into which is thereupon forced a punch of similar shape, the composite metal being extruded from the die around the punch to form a collapsible tin-plated lead tube of the desired shape, diameter and length.

During the metal extrusion process the metal flows in such a way that both the inside and the outside faces of the tube are coated with tin, and the inner core of the metal is composed of lead. This process, however, brings about the existence of a surplus quantity of the tin-plated metal which is left over after the discs have been cut from the original sheet, and in the ordinary course of manufacture this metal has to be re-used; this excess amounts to some two-thirds of the original weight of the rolled composite sheet.

The usual individual thicknesses of the layers of the composite sheet are such as to make the total content of tin to be five to ten per cent; the surplus metal therefore contains tin in the same percentage. The tin thereon is welded to the lead core and can only be separated therefrom by electrical, mechanical or chemical means, all of which are costly. This surplus metal has therefore often been melted and mixed with additional new lead, the mixture then being used for the inner core of subsequent composite sheets which must obviously then contain a proportion of unrequired tin. This method of using the surplus metal is uneconomic because tin, which is many more times more expensive than lead, is wasted.

The purpose of this invention is to form the disc in such a way that the layers of tin and lead in the surplus metal can be readily and cheaply separated by manual means.

According to the invention, the three layers of tin, lead and tin are obtained separately, for instance by rolling, in their finished thicknesses for the extrusion machine, such as will provide the desired percentage of plating on the inside and outside of the finished tube, and they are then laid together and the discs cut out from the superimposed layers. After the discs have been cut out, the three sheets of tin, lead and tin comprising the surplus metal can be stripped apart by hand and re-used in their pure form. The action of shearing the discs from the sheet is sufficient to weld up the edges of the metal round the discs so as to prevent the three separate pieces of the disc from falling apart.

When the disc is placed in the die, the three layers of metal extrude from the die simultaneously, and this extrusion welds them together in the same way as they are welded together by the existing well-known process of rolling three thickness of the two metals, mentioned above.

When the extrusion is carried out after plating by the usual well-known method, all three layers, by the fact of being welded together, are forced to extrude at approximately the same rate, but because the edges of the discs are not plated, the first part of the tube to be extruded from the die, that is the open end, consists of core metal only, i. e. lead, and the resulting tube is plated for most of its length, with a portion of the open end not plated. The edge of the plating is usually ragged and a considerable portion of the tube must be cut off in order to achieve a finished tube uniformly plated throughout.

With the loose plating method according to this invention, it is advisable that both metals have substantially the same rate of extrusion, as the three layers are not welded together until extrusion actually occurs. To achieve this result, it is advisable for the inner and outer layers of tin to be alloyed with suitable other metals.

The outside and inside plating alloys need not necessarily be of the same composition. The lead core may also be alloyed with other metals in order to improve the quality of the resulting tube, for instance in the way of ductility and rigidity, and for each alloy of the inner core different alloys of the inner and outer plating are necessary.

In order to overcome the initial extrusion of part of the tube in an unplated condition, the discs according to this invention may be cut slightly larger than the die from which the tube is to be extruded, and they are placed in an additional recess in the die of the same diameter as the disc; the effect of this is to produce a tube which is uniformly plated throughout its length and has only a small ring of thick unplated and partly plated lead at its open end, which has to be cut off.

The accompanying drawing shows how this may be achieved.

In the drawing Figure 1 is a side elevation of a punch partly cut away;

Figure 1:
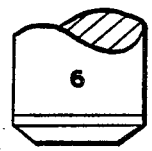
Figure 2:
Figure 2 is a side or edge elevation of a disk of imposed layers of tin, lead, and tin respectively.
Figure 3:
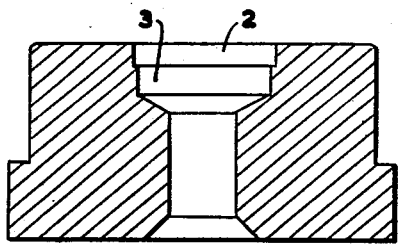
Figure 3 is a cross section of a die.

A disc 1 is cut to the same diameter as that of a recess 2 in which it is placed. The diameter of the recess 2 is slightly larger than the diameter of a die 3 from which the tube is to be extruded. The lead inner layer of the disc is shown at 4, the outer tin plating layers being shown at 5. When the punch 6 presses the disc from the recess 2 into the die 3 the first effect is to force the outside portion of the lower plating layer 5 around the side of the disc so as to cover the outside surface 7 of the lead with tin. The action of extruding the tube consists, as is well known, in forcing the punch down the die 3, the extruded metal rising up the outside of the punch. It will be understood that since the effect of forcing the disc from the recess 2 into the die 3 is to cause the edge of the disc to be covered with the plating metal before the actual extrusion process begins, the result will be that the tube when it is extruded has a ring of unplated and partly plated lead at its open end which is much smaller than would be the case if the recess 2 were not used. In the following claims where the word "tin" is used, it is intended to be broad enough to include tin alloyed with suitable other metals, and where the word "lead" is used, it is intended to be broad enough to cover lead alloyed with other metals, as set forth above.

Having now particularly described and ascertained the nature of the said invention and in what manner the same is to be performed, what I claim is:

1. The steps in the manufacture of tin-plated lead collapsible tubes, comprising laying together separate layers of tin, lead and tin of respective thicknesses which will provide the desired percentage of plating on the inside and outside of the finished tube, cutting discs from the superimposed layers and placing the superimposed discs in an extrusion machine.

2. The steps in the manufacture of tin-plated lead collapsible tubes, comprising laying together separate layers of tin, lead and tin of respective thicknesses such as will provide the desired percentage of plating on the inside and outside of the finished tube, cutting discs from the superimposed layers for extrusion into collapsible tubes and separating the three sheets of tin, lead and tin comprising the surplus metal after the discs have been cut out, by stripping them apart.

3. The process of manufacturing a tin-plated lead collapsible tube, comprising laying together separate layers of tin, lead, and tin in superimposed position, cutting from said superimposed separate layers a disc having a diameter larger than the main die from which the tube is to be extruded and of the same diameter as an additional recess in said die, placing the disc in the additional recess, and extruding the disc from said additional recess into the main die whereby initial extrusion of part of the tube in a partly unplated condition is reduced and thereby reducing the amount of unplated lead at the open end of the tube which has to be cut off.

4. The process of manufacturing a tin-plated lead collapsible tube, comprising laying together separate layers of tin, lead, and tin in superimposed position, cutting a disc from said superimposed separate layers, and extruding the disc in an extrusion machine.

EUSTACE STATHER-DUNN.